United States Patent
Miyagi et al.

(10) Patent No.: US 8,735,769 B2
(45) Date of Patent: May 27, 2014

(54) LASER PROCESSING HEAD AND LASER CLADDING METHOD

(75) Inventors: Masanori Miyagi, Hitachi (JP); Takeshi Tsukamoto, Mito (JP); Hirotsugu Kawanaka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 675 days.

(21) Appl. No.: 12/907,255

(22) Filed: Oct. 19, 2010

(65) Prior Publication Data
US 2011/0089151 A1 Apr. 21, 2011

(30) Foreign Application Priority Data

Oct. 20, 2009 (JP) .................................. 2009-240974

(51) Int. Cl.
*B23K 26/34* (2006.01)
*B23K 26/14* (2006.01)

(52) U.S. Cl.
USPC .................................. 219/121.64; 219/121.84

(58) Field of Classification Search
USPC ............. 219/121.65, 121.66, 121.63, 121.64, 219/121.84
See application file for complete search history.

(56) References Cited

U.S. PATENT DOCUMENTS

| | | | | |
|---|---|---|---|---|
| 2006/0169679 A1* | 8/2006 | Sato et al. | ................. | 219/121.64 |
| 2007/0071907 A1* | 3/2007 | Stiles et al. | ............... | 219/121.84 |
| 2007/0193981 A1* | 8/2007 | Peng et al. | ............... | 219/121.84 |
| 2009/0057278 A1* | 3/2009 | Nowotny et al. | ......... | 219/121.63 |
| 2009/0095214 A1* | 4/2009 | Whitfield | ..................... | 118/50.1 |
| 2012/0199564 A1* | 8/2012 | Washko et al. | .......... | 219/121.63 |

FOREIGN PATENT DOCUMENTS

| | | | |
|---|---|---|---|
| DE | 3801 068 | | 7/1989 |
| DE | 10 2005 058 172 | | 6/2007 |
| EP | 444550 A | * | 9/1991 |
| GB | 1184818 | | 3/1970 |
| GB | 2 227 964 | | 8/1990 |
| JP | 02-258186 | | 10/1990 |
| JP | 10-277761 | | 10/1998 |
| JP | 11-333584 A | * | 12/1999 |
| JP | 2010-207877 | | 9/2010 |
| JP | 2010-207877 A | * | 9/2010 |

OTHER PUBLICATIONS

Machine translation of Japan Patent No. 2010-207,877, Sep. 2013.*
Machine translation of Japan Patent No. 2010-207,877, Jan. 2014.*
Office Action issued in Japanese Patent Application No. 2009-240974 on Feb. 26, 2013.

* cited by examiner

*Primary Examiner* — Geoffrey S Evans
(74) *Attorney, Agent, or Firm* — Antonelli, Terry, Stout & Kraus, LLP.

(57) ABSTRACT

A laser processing head in accordance with the present invention comprises: a laser emitting unit for irradiating a workpiece with a laser light; and a powder feeder disposed around a periphery of the laser emitting unit for discharging filler material powder to the workpiece, in which the powder feeder includes: a position adjustment mechanism for adjusting a position where the powder concentrates; and a powder concentration diameter adjustment mechanism for adjusting a diameter of the filler material powder. The laser processing head further comprises a controller for controlling the position adjustment mechanism and the powder concentration diameter adjustment mechanism.

12 Claims, 7 Drawing Sheets

LASER PROCESSING HEAD AND LASER CLADDING METHOD

CLAIM OF PRIORITY

The present application claims priority from Japanese patent application serial no. 2009-240974 filed on Oct. 20, 2009, the content of which is hereby incorporated by reference into this application.

BACKGROUND OF THE INVENTION

1. Field of the Invention

The present invention relates to laser cladding methods where a powdered filler material is used and laser processing heads for laser cladding.

2. Description of the Related Art

In recent years, laser cladding in which a powdered filler material is used has been used for the direct production of near-net shape components and surface treatment techniques to impart functions such as abrasion resistance. In such laser cladding, the shape of a clad depends strongly on powder delivery. Therefore, various powder delivery methods, including controlling the direction of powder delivery with respect to the cladding direction (laser scanning direction) and increasing the stability of the powder feed rate, have been tried to achieve high-precision clad forming.

For example, JP-A Hei 2 (1990)-258186 (U.S. Pat. No. 307,796) discloses a method for controlling the position where powder flow concentrates most (hereinafter referred to as "powder concentration position") with respect to the laser optical axis. In this method, powder is delivered to a laser irradiation portion or in its proximity such that powder concentrates toward the laser optical axis from the periphery of the laser, and the powder concentration position is vertically adjustable along the laser optical axis. The laser cladding device used in this method includes a laser emitting unit and a powder feed nozzle provided around the periphery of the laser emitting unit, allowing powder to flow through the gap formed by the laser emitting unit and the powder feed nozzle. The powder concentration position is adjustable by vertically adjusting the relative position between the lower ends of the laser emitting unit and the powder feed nozzle to change the powder delivery angle.

In the laser cladding device described in JP-A Hei 2 (1990)-258186 (U.S. Pat. No. 307,796), adjusting the powder concentration position changes the diameter of the powder concentration position (hereinafter referred to as "powder concentration diameter"). Since adjusting one of the powder concentration position and the powder concentration diameter inevitably changes the other, in order to adjust both the powder concentration position and the powder concentration diameter at the same time, the positions of the laser emitting unit and the powder feed nozzle need to be adjusted vertically along the laser optical axis without changing the relative position between the lower ends of the laser emitting unit and the powder feed nozzle.

Therefore, every time the cladding track width is changed, the cladding operation has to be discontinued to adjust the powder concentration position and the powder concentration diameter. Moreover, every time the powder concentration position and the powder concentration diameter are adjusted, the distance between the tip of the laser emitting unit and the surface of a workpiece changes. Consequently, when a shield gas to protect a cladding portion from the atmosphere is allowed to flow from the inside of the laser emitting unit, the shielding properties of the gas inevitably change every time the powder concentration position and the powder concentration diameter are adjusted. These factors conspire to impair the soundness of the laser cladding process (welding).

SUMMARY OF THE INVENTION

In view of the foregoing, it is an objective of the present invention to provide a laser processing head that makes it possible to change the cladding track width arbitrarily during a cladding operation and a laser cladding method in which the laser processing head is used in order to improve clad shape controllability while securing the soundness of laser cladding.

(I) In accordance with one aspect of the present invention, there is provided a laser processing head which includes: a laser emitting unit to irradiate a workpiece with a laser light; a powder feeder disposed around a periphery of the laser emitting unit to discharge filler material powder to a laser irradiation portion; a mechanism to drive the powder feeder vertically along a laser optical axis of the laser emitting unit; a mechanism to adjust a powder delivery angle; and a mechanism to control each of the mechanisms by external signals.

In the above aspect (I) of the invention, the following modifications and changes can be made.

(i) The position adjustment mechanism is a mechanism for adjusting a distance between the powder feeder and the workpiece; and the powder concentration diameter adjustment mechanism is a mechanism for adjusting a powder delivery angle.

(ii) The powder feeder comprises a plurality of tubular elements disposed such that the filler material powder is discharged from the tubular elements in a form of a concentric circle with a laser optical axis as a center; and the powder concentration diameter adjustment mechanism is a mechanism for adjusting angles of the tubular elements with respect to the laser optical axis.

(iii) The plurality of tubular elements have at least two types of shapes.

(iv) The powder feeder comprises an inner nozzle provided around a periphery of a laser optical axis and an outer nozzle provided around a periphery of the inner nozzle, a tip region of each of the nozzles being shaped a truncated cone, allowing the filler material powder to flow through a gap between the inner nozzle and the outer nozzle; and the powder concentration diameter adjustment mechanism adjusts a relative position between the tip of the inner nozzle and the tip of the outer nozzle.

(v) The laser processing head further comprises a gas flow adjustment mechanism for adjusting a relative position between a tip of a gas nozzle and the tip of the outer nozzle, the tip region of the gas nozzle being shaped a truncated cone, the gas nozzle being provided around a periphery of the powder feeder, allowing a gas to flow through a gap between the outer nozzle and the gas nozzle.

(vi) The laser processing head further comprises a shield gas flow adjustment mechanism for adjusting a distance between a position of a tip of a cylindrical element with a central axis that is identical with a laser optical axis and the workpiece, the cylindrical element being provided inside the powder feeder, allowing a gas to flow inside the cylindrical element.

(vii) The position adjustment mechanism is a mechanism for changing a position of the powder feeder vertically along a laser optical axis.

(II) In accordance with another aspect of the present invention, there is provided a laser cladding method for forming a clad by irradiating a workpiece with a laser light from a laser emitting unit and delivering filler material powder from a powder feeder provided around a periphery of the laser emitting unit to a laser irradiation portion such that the filler material powder concentrates on a laser optical axis while changing a laser focal position with respect to a surface of the workpiece and the powder concentration position independently and vertically along the laser optical axis during a cladding operation.

In the above aspect (II) of the invention, the following modifications and changes can be made.

(viii) The laser cladding method further comprises step of controlling the position where the flow of filler material powder concentrates most during the cladding operation.

(ix) The laser cladding method further comprises steps of: delivering the filler material powder through a powder flow path formed by a plurality of tubular elements; and controlling the position where the flow of the filler material powder concentrates most by moving a powder feeder along the laser optical axis.

(x) The laser cladding method further comprises steps of: delivering the filler material powder through a powder flow path formed by a plurality of tubular elements disposed radially with respect to the laser optical axis; and controlling a powder delivery angle by changing angles of the tubular elements with respect to the laser optical axis.

(xi) The laser cladding method further comprises steps of: delivering the filler material powder through a gap formed by an inner nozzle and an outer nozzle, a tip region of each of the nozzles being shaped a truncated cone; and controlling a powder delivery angle by changing a position of the tip of the inner nozzle and a position of the tip of the outer nozzle so as to change a relative position between the tips.

(xii) The laser cladding method further comprises step of adjusting the flow of the filler material powder by a gas flow provided outside the flow of the filler material powder.

(xiii) The laser cladding method further comprises step of adjusting the flow of the filler material powder through a gap between an inner nozzle and an outer nozzle by changing a position of a tip of the outer nozzle and a position of a tip of a gas nozzle provided around a periphery of the outer nozzle so as to change an angle of the gas flow.

(xiv) The laser cladding method further comprises step of blowing a gas from a cylindrical element provided inside a powder feeder to a surface of the workpiece such that the gas flows inside the flow of the filler material powder while maintaining a constant distance between a lower end position of the cylindrical element and the surface of the workpiece.

ADVANTAGES OF THE INVENTION

According to the above-described configuration, it is possible to provide a laser processing head and a laser cladding method in which the powder concentration position and the powder concentration diameter are adjustable during a cladding operation and the cladding track width is arbitrarily controllable. Furthermore, laser cladding can be performed while maintaining stable shielding properties in spite of the above-described adjustments.

DETAILED DESCRIPTION OF THE PREFERRED EMBODIMENTS

Preferred embodiments of the present invention will be described hereinafter in detail. The present invention is not limited to the specific embodiments described below, but various modifications or combinations of its features are possible within the scope of the present invention.

In general, when laser cladding is performed using a powdered filler material, the shape of a clad depends largely on powder delivery. In order to obtain a desired track width, in particular, it is necessary to control not only laser irradiation conditions but also the powder concentration diameter. Controlling the powder concentration diameter to form a clad of a desired cladding track width irrespective of the cladding direction significantly affects the facture of the finished product.

A facile way to control the powder concentration diameter and the laser focal position is to change the distance between the tip of a laser processing head and a workpiece. In the case of a laser processing head having a mechanism for discharging a shield gas to protect a cladding portion from the atmosphere, however, the conditions of the shield gas (shielding properties) are prone to change.

Therefore, the inventors have studied the possibility of independently controlling the laser focal position and the powder concentration position together with the possibility of controlling these positions during a cladding operation.

In accordance with an essential concept of the present invention, a laser processing head for laser cladding in which a powdered filler material is used has a laser emitting unit and a powder feeder to discharge powder in the form of a concentric circle with, as a center, the optical axis of a laser light emitted from the laser emitting unit. The powder feeder has a mechanism to adjust the powder delivery angle with respect to the laser optical axis and the angle adjustment mechanism is controllable by external signals. The powder feeder also has a position adjustment mechanism to drive itself vertically along the laser optical axis and the position adjustment mechanism is also controllable by external signals. This configuration allows the cladding track width to be controlled arbitrarily during a cladding operation.

In the preferred embodiments, the powder feeder includes a plurality of tubular elements disposed such that the filler material powder is discharged in the form of a concentric circle with the laser optical axis toward the laser optical axis. The angles of the tubular elements with respect to the laser optical axis are adjusted to control the powder delivery angle.

In addition, there are provided an inner nozzle and an outer nozzle, which are tapered and truncated-cone-shaped tubular elements, the outer nozzle being disposed around the periphery of the inner nozzle. The central axis of each of the nozzles is identical with the laser optical axis, and the filler material powder is allowed to flow through the gap between the inner nozzle and the outer nozzle. The positions of the inner nozzle and the outer nozzle are adjusted vertically along the laser optical axis to adjust the relative position between the lower ends of the inner nozzle and the outer nozzle, thereby adjusting the powder delivery angle. The cladding track width is arbitrarily controllable during a cladding operation by externally controlling the position adjustment mechanism to adjust the positions of the inner and outer nozzles.

A gas nozzle may be provided around the periphery of the powder feeder. The delivery angle of the filler material powder discharged from the powder feeder is adjustable by controlling the direction of the gas fed from the gas nozzle. In the case of a cone-frustum-shaped gas nozzle with a gas allowed to flow through the gap between the gas nozzle and the powder feeder, there may be provided a mechanism to vertically adjust the relative position between the lower end of the gas nozzle and the lower end of the powder feeder. In this case, the powder delivery angle is adjustable by externally adjusting the relative position during a cladding operation.

Furthermore, a cylindrical element having a central axis that is identical with the laser optical axis may be provided inside the powder feeder, allowing a gas to flow inside the cylindrical element. There may be provided a shield gas flow adjustment mechanism to maintain stable shielding properties by adjusting the distance between the tip of the cylindrical element and a workpiece.

Use of the above-described laser processing head makes it possible to obtain a desired cladding track width by controlling the laser focal position and the powder concentration diameter while maintaining the shielding properties of a shield gas at a cladding portion in a stable manner even when a need arises to change the cladding track width during the cladding operation.

In laser cladding, a workpiece is irradiated with a laser light from a laser emitting unit, and a powdered filler material is delivered to a laser irradiation portion from a powder feeder provided around the periphery of the laser emitting unit such that the filler material powder concentrates on the laser optical axis, thereby forming a clad. In the preferred embodiments, the laser focal position with respect to the cladding surface and the powder concentration position are changed independently and vertically along the laser optical axis during a cladding operation. Or, in laser cladding in which a workpiece is irradiated with a laser light from a laser emitting unit, and a powdered filler material is delivered to the laser irradiation portion from a powder feeder provided around the periphery of the laser emitting unit such that the filler material powder concentrates on the laser optical axis, thereby forming a clad, the powder concentration diameter is changed during a cladding operation. Or, the laser focal position with respect to the cladding surface and the powder concentration position are changed independently and vertically along the laser optical axis while the powder concentration diameter is changed during a cladding operation. The laser focal position with respect to the cladding surface and the powder concentration position are adjustable by changing the positions of the laser emitting unit and the powder feeder vertically along the laser optical axis.

The powder flow is adjustable by controlling the delivery angle of the filler material powder fed from the powder feeder. For example, the powder delivery angle is controllable by composing the powder feeder from a plurality of concentric tubular elements and by changing the angles of the tubular elements. On the other hand, the powder delivery angle may also be controllable by forming the powder feeder with an inner nozzle and an outer nozzle whose tips are cone-frustum-shaped, allowing the filler material powder to flow through the gap between the inner nozzle and the outer nozzle, and adjusting the positions of the inner nozzle and the outer nozzle vertically along the laser optical axis to change the relative position between the lower ends of the inner nozzle and the outer nozzle. The powder delivery angle may also be made controllable by a gas flow. In this case, a cone-frustum-shaped gas nozzle is provided around the periphery of the powder feeder, allowing a gas to flow through the gap between the outer nozzle and the gas nozzle, adjusting the positions of the outer nozzle and the gas nozzle vertically along the laser optical axis, and thus changing the relative position between the lower ends of the outer nozzle and the gas nozzle to change the gas flow angle.

It is preferred that laser cladding is performed while maintaining a constant distance between the lower end of a cylindrical element provided inside the powder feeder and the surface of a workpiece and blowing a gas from the cylindrical element to the surface of the workpiece such that the gas is allowed to flow inside the powder flow. This configuration makes it possible to maintain stable shield properties.

In another aspect of the present invention, a laser processing head for laser cladding is provided with a laser emitting unit to irradiate a workpiece with a laser light; a powder feeder disposed around the periphery of the laser emitting unit to discharge a powdered filler material to a laser irradiation portion; a mechanism to drive the powder feeder vertically along the laser optical axis of the laser emitting unit; a mechanism to adjust the powder delivery angle; and a mechanism to control each of the mechanisms by external signals.

It is preferred that the powder feeder provided around the periphery of the laser emitting unit includes a plurality of tubular elements disposed such that the filler material powder is discharged in the form of a concentric circle with the laser optical axis toward the laser optical axis, and it has a mechanism to adjust the angles of the tubular elements with respect to the laser optical axis. In such a case, the outlets of the plurality of tubular elements may be different in shape. Additionally, in the powder feeder, there are preferably provided a selection mechanism to select tubular elements to deliver the filler material powder from among the plurality of tubular elements and a mechanism to control the selection mechanism by external signals.

It is also preferred that the powder feeder is provided with an inner nozzle and an outer nozzle provided around the periphery of the inner nozzle, each having a cone-frustum-shaped tip and a central axis that is identical with the laser optical axis; the filler material powder is allowed to flow through the gap between the inner nozzle and the outer nozzle; and the positions of the inner nozzle and the outer nozzle are adjusted vertically along the laser optical axis to adjust the relative position between the lower ends of the inner nozzle and outer nozzle. Furthermore, there are preferably provided a gas nozzle with a cone-frustum-shaped tip and a central axis that is identical with the laser optical axis, the gas nozzle being disposed around the periphery of the powder feeder such that a gas is allowed to flow through the gap between the outer nozzle and the gas nozzle; and a mechanism to adjust the relative position between the lower ends of the outer nozzle and the gas nozzle by adjusting the position of the gas nozzle vertically with respect to the outer nozzle of the powder feeder.

Moreover, there are preferably provided a cylindrical element with a central axis that is identical with the laser optical axis, the cylindrical element being disposed inside the powder feeder such that a gas is allowed to flow inside the cylindrical element; a mechanism to maintain a constant distance between the lower end of the cylindrical element and the surface of a workpiece; and a mechanism to control the above-mentioned mechanism by external signals.

Preferred embodiments of the present invention will be described in further detail hereinafter with reference to the accompanying drawings. Like parts are designated by like reference numerals without repeating the description thereof.

[First Embodiment of the Invention]

Figure 1:
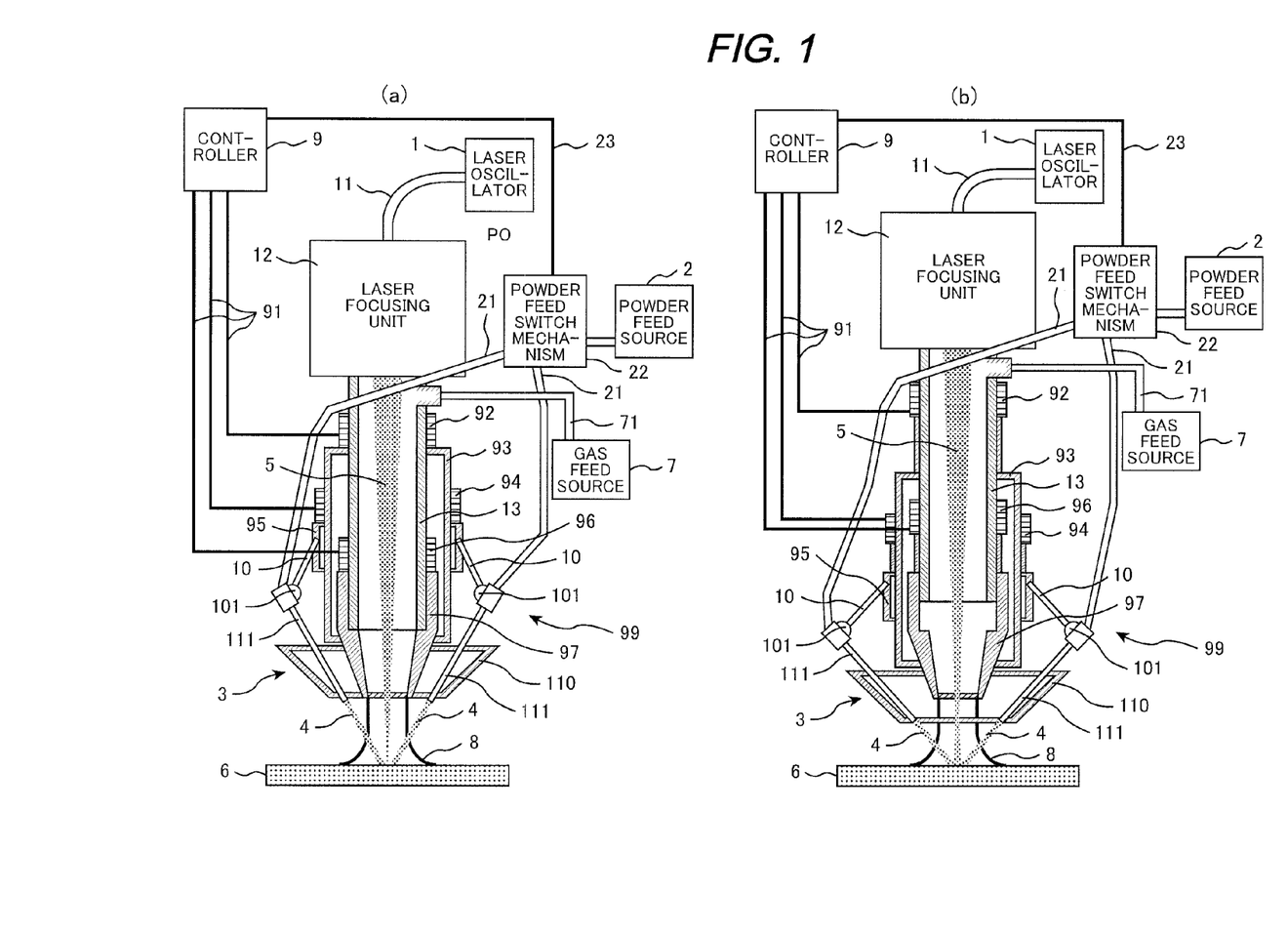
FIG. 1 is schematic diagrams showing a cross-sectional view of a laser processing head in accordance with a first embodiment of the present invention.

FIG. 1 is schematic diagrams showing a cross-sectional view of a laser processing head in accordance with a first embodiment of the present invention. Specifically, FIG. 1(a) shows an exemplary arrangement of the laser processing head; and FIG. 1(b) shows another exemplary arrangement thereof. As shown in FIGS. 1(a) and 1(b), the laser processing head includes: a laser oscillator 1, an optical fiber 11, a laser focusing unit 12, a laser emitting unit 13, a powder feed source 2, powder feed tubes 21, a powder feed switch mechanism 22, a powder feed switch signal line 23, a powder feeder 3, a gas feed source 7, a gas feed tube 71, a controller 9, vertical drive control signal lines 91, a powder feeder vertical positioning mechanism 92, a powder feeder vertical drive 93, an angle adjustment unit vertical positioning mechanism 94, an angle adjustment unit vertical drive 95, a shield gas nozzle positioning mechanism 96, a shield gas nozzle 97, an angle adjustment unit 99, arms 10, angle adjusters 101, a holder 110, and powder feed small nozzles 111. FIG. 1 also shows: filler material powder 4, a laser light 5, a workpiece 6, and a shield gas flow 8.

The laser light 5 oscillated by the laser oscillator 1 is transmitted through the optical fiber 11 to the laser focusing unit 12, where it is focused, and it is irradiated to the workpiece 6 via the laser emitting unit 13. The powder feed source 2 is filled with a powdered filler material to be fed during a cladding operation. The filler material powder 4 fed from the powder feed source 2 is delivered through the powder feed tubes 21 to the plurality of powder feed small nozzles 111 and discharged to a laser irradiation portion. The lower ends of the powder feed small nozzles 111 are held by the holder 110 equiangularly with respect to the laser optical axis. As a result, the filler material powder 4 discharged from the powder feed small nozzles 111 is delivered such that it converges on the laser optical axis.

The laser emitting unit 13 connected to the laser focusing unit 12 is provided with the gas feed tube 71 and the shield gas nozzle 97, from which the shield gas flow 8 is allowed to blow to the workpiece 6. Also, the distance between a tip of the shield gas nozzle 97 and a surface of the workpiece 6 (hereinafter referred to as "standoff") is controllable by vertically adjusting the position of the tip of the shield gas nozzle 97 with the shield gas nozzle positioning mechanism 96 provided on the shield gas nozzle 97. In the present embodiment, an electrical actuator is used for the shield gas nozzle positioning mechanism 96. In addition, since the shield gas nozzle positioning mechanism 96 is controlled by external signals from the controller 9, the position of the shield gas nozzle 97 is vertically adjustable during a cladding operation.

Figure 2:
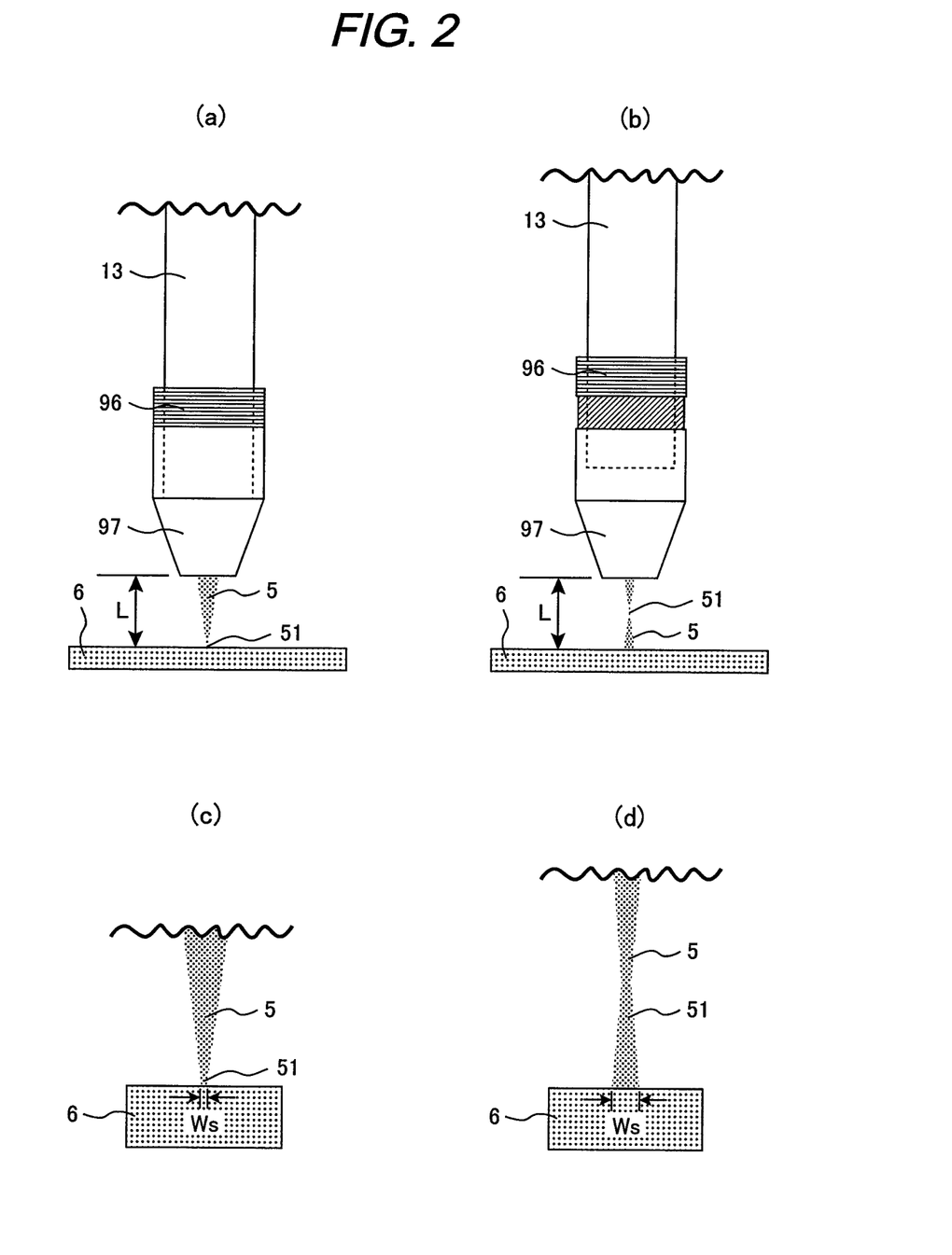
FIG. 2 is schematic diagrams showing a relationship among a position of a laser emitting unit, laser spot diameter and a position of a shield gas nozzle in accordance with the first embodiment.

FIG. 2 is schematic diagrams showing a relationship among a position of a laser emitting unit, laser spot diameter and a position of a shield gas nozzle in accordance with the first embodiment. Specifically, FIG. 2(a) shows a relative position among the laser emitting unit 13, the shield gas nozzle 97 and the workpiece 6 when a laser focal position 51 is set on a surface of the workpiece 6 and the standoff is assumed to be L. FIG. 2(b) shows another relative position among the laser emitting unit 13, the shield gas nozzle 97 and the workpiece 6 when the laser focal position 51 is moved upward from the surface of the workpiece 6 by a certain distance. FIG. 2(c) and FIG. 2(d) are magnified views of the laser irradiation portion in FIG. 2(a) and FIG. 2(b), respectively. In the case of changing the laser spot diameter Ws, the laser focal position 51 is changed vertically while at the same time the lower end position of the shield gas nozzle 97 is adjusted with the shield gas nozzle positioning mechanism 96 such that the standoff is maintained to be the constant distance L as shown in FIG. 2(b). Conducting the above-described operations makes it possible to maintain a desirable constant standoff and thus obtain stable shield properties.

Meanwhile, as shown in FIG. 1, the powder feeder 3 disposed around the periphery of the laser emitting unit 13 includes: the powder feeder vertical drive 93, the angle adjustment unit 99 disposed around the periphery of the powder feeder vertical drive 93, the powder feed small nozzles 111 coupled with the angle adjustment unit 99, and the holder 110 connected at the lower end of the powder feeder vertical drive 93. In the powder feeder 3, the powder concentration position is controllable by vertically adjusting the position of the tip of the powder feeder 3 with the powder feeder vertical positioning mechanism 92 mounted atop the powder feeder vertical drive 93. In the present embodiment, an electrical actuator is used for the powder feeder vertical positioning mechanism 92. In addition, since the powder feeder vertical positioning mechanism 92 is controlled by external signals from the controller 9, the position of the powder feeder 3 is vertically adjustable during a cladding operation.

Also in the powder feeder 3, the powder delivery angle is controllable by the angle adjustment unit 99 coupled with the powder feed small nozzles 111. The angle adjustment unit 99 includes: the angle adjustment unit vertical drive 95, the arms 10, and the angle adjusters 101, each being disposed on the periphery of the powder feeder vertical drive 93. The position of the angle adjustment unit vertical drive 95 is controllable vertically along the laser optical axis with the angle adjustment unit vertical positioning mechanism 94 mounted atop the angle adjustment unit vertical drive 95. Each of the arms 10 is coupled with each of the angle adjusters 101 with a pin such that the vertical motion of the angle adjustment unit vertical drive 95 changes the angle formed by each of the arms 10 and each of the angle adjusters 101. In addition, each of the powder feed small nozzles 111 is coupled with each of the angle adjusters 101. Therefore, the vertical position adjustment of the angle adjustment unit vertical drive 95 changes the angle formed by each of the arms 10 and each of the angle adjusters 101, which changes the angle of the powder feed small nozzles 111 with respect to the laser optical axis. This makes it possible to adjust the powder delivery angle and, as a result, to control the powder concentration diameter. In the present embodiment, an electrical actuator is used for the angle adjustment unit vertical positioning mechanism 94. In addition, since the angle adjustment unit vertical positioning mechanism 94 is controlled by external signals from the controller 9, the position of the angle adjustment unit vertical drive 95 is vertically adjustable during a cladding operation.

Figure 3:
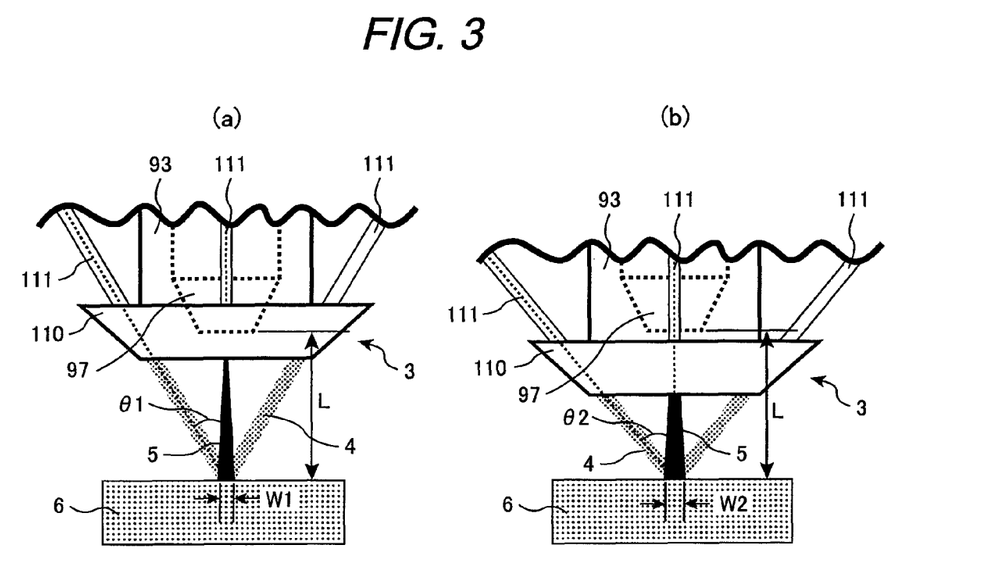
FIG. 3 is schematic diagrams showing a method for controlling a cladding track width of a laser processing head in accordance with the first embodiment.

FIG. 3 is schematic diagrams showing a method for controlling a cladding track width of a laser processing head in accordance with the first embodiment. Specifically, FIG. 3(a) shows a relative position of each part when the cladding track width is assumed to be W1. FIG. 3(b) shows another relative position of each part after the cladding track width is changed to W2. To change the cladding track width from W1 to W2, the laser spot diameter and the powder concentration diameter need to be comparable to the cladding track width W2. The laser focal position is adjusted vertically along the laser optical axis to change the laser spot diameter while at the same time the lower end position of the shield gas nozzle 97 is adjusted with the shield gas nozzle positioning mechanism 96 shown in FIG. 1 such that the standoff is maintained to be the constant distance L. Also, the position of the angle adjustment unit vertical drive 95 shown in FIG. 1 is adjusted vertically along the laser optical axis to change the angle of each of the powder feed small nozzles 111 with respect to the laser optical axis from θ1 to θ2, thus adjusting the powder delivery angle so as to match the powder concentration diameter to W2. In addition, the position of the powder feeder vertical drive 93 shown in FIG. 1 is adjusted vertically along the laser optical axis to set the powder concentration position on the surface of the workpiece 6. However, the optimal powder concentration position is not to be considered limited to the surface of a workpiece.

Controlling the above-described operations at the same time by external signals makes it possible to adjust the cladding track width to any width. Consequently, in the laser cladding processing head in accordance with the present embodiment, there is no need to discontinue a cladding operation every time the need arises to change the cladding track width.

Figure 4:
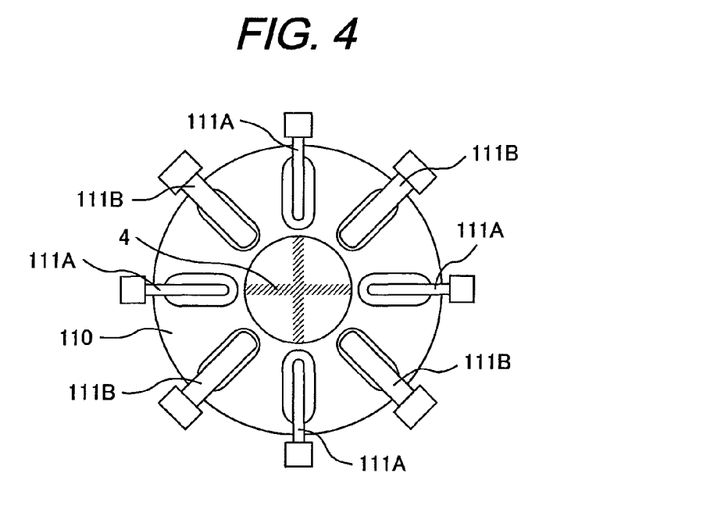
FIG. 4 is a schematic diagram showing an exemplary layout of powder feed small nozzles in accordance with the first embodiment.

FIG. 4 is a schematic diagram showing an exemplary layout of powder feed small nozzles in accordance with the first embodiment. As shown in FIG. 4, in the present embodiment, powder feed small nozzles 111A of 1 mm in inner diameter and powder feed small nozzles 111B of 2 mm in inner diameter, four each of them, are alternately arranged at equal intervals toward the laser optical axis. Each of the powder feed small nozzles 111 is coupled with the powder feed switch mechanism 22 by each of the powder feed tubes 21, as shown in FIG. 1. The powder feed switch mechanism 22 can select the number and the kind (inner diameter) of the powder feed small nozzles 111A and 111B that feed powder. For example, only the powder feed small nozzles 111A of 1 mm in inner diameter can be selected. However, since the powder feed switch mechanism 22 is controlled by external signals from the controller 9, powder feed adjustments can be made by selecting the number and the kind of the powder feed small nozzles 111A and 111B during a cladding operation.

Although in the first embodiment, an electrical actuator is used for: the powder feeder vertical positioning mechanism 92; the angle adjustment unit vertical positioning mechanism 94; and the shield gas nozzle positioning mechanism 96, the configuration is not to be considered limited to this. Also in the present embodiment, four each of the powder feed small nozzles 111A and 111B of 1 mm and 2 mm in diameter are used. However, the number and the inner diameter of the powder feed small nozzles 111 are not to be considered limited to those in the present embodiment.

[Second Embodiment of the Invention]

Figure 5:
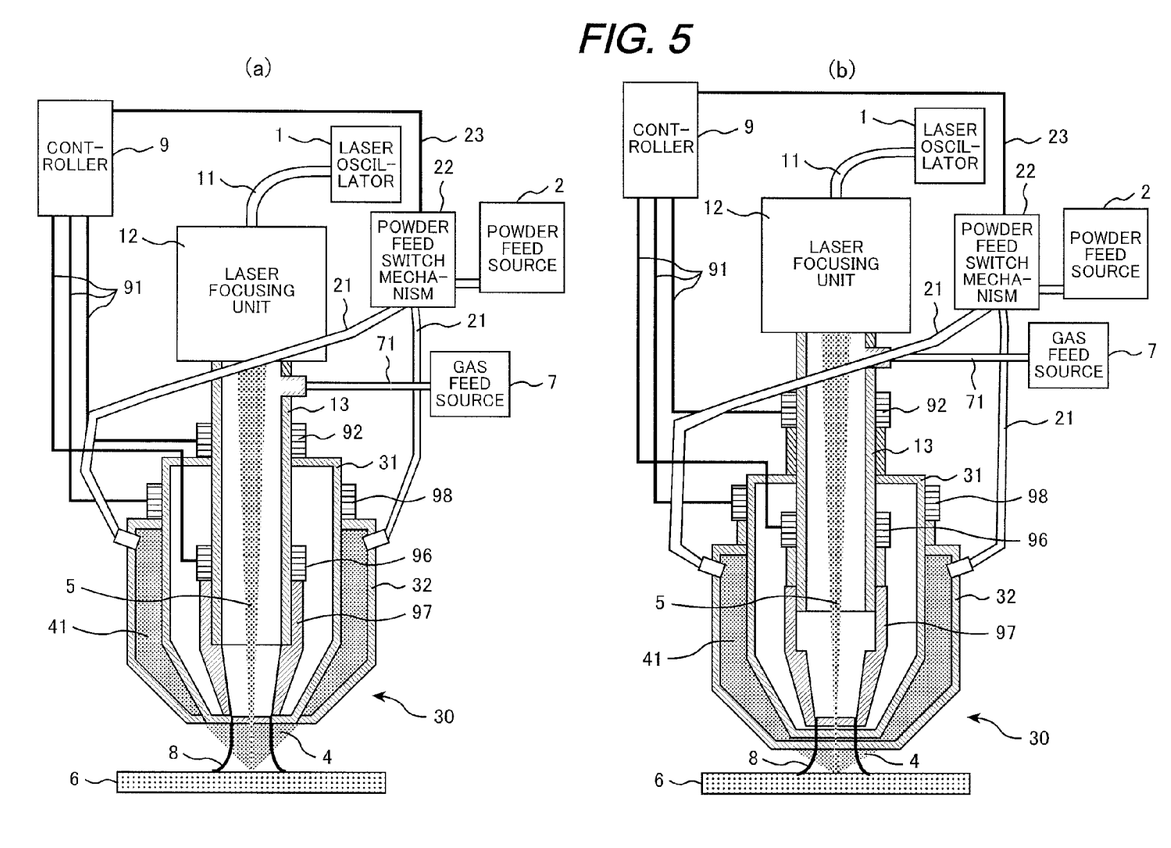
FIG. 5 is schematic diagrams showing a cross-sectional view of a laser processing head in accordance with a second embodiment of the present invention.

FIG. 5 is schematic diagrams showing a cross-sectional view of a laser processing head in accordance with a second embodiment of the present invention. Specifically, FIG. 5(a) shows an exemplary arrangement of the laser processing head; and FIG. 5(b) shows another exemplary arrangement thereof. As shown in FIGS. 5(a) and 5(b), the laser processing head includes: a laser oscillator 1, an optical fiber 11, a laser focusing unit 12, a laser emitting unit 13, a powder feed source 2, powder feed tubes 21, a powder feed switch mechanism 22, a powder feed switch signal line 23, a powder feeder 30, an inner nozzle 31, an outer nozzle 32, a powder flow path 41, a gas feed source 7, a gas feed tube 71, a controller 9, vertical drive control signal lines 91, a powder feeder vertical positioning mechanism 92, a shield gas nozzle positioning mechanism 96, a shield gas nozzle 97, and an outer nozzle vertical positioning mechanism 98. FIG. 5 also shows: filler material powder 4, a laser light 5, a workpiece 6, and a shield gas flow 8.

The laser light 5 oscillated by the laser oscillator 1 is transmitted through the optical fiber 11 to the laser focusing unit 12, where it is focused, and it is irradiated to the workpiece 6 via the laser emitting unit 13. The powder feed source 2 is filled with a powdered filler material to be fed during a cladding operation. The filler material powder 4 fed from the powder feed source 2 is delivered through the powder feed tubes 21 to the powder flow path 41 formed by the inner nozzle 31 and the outer nozzle 32 and discharged such that it concentrates on a laser irradiation portion.

The laser emitting unit 13 connected to the laser focusing unit 12 is provided with the gas feed tube 71 and the shield gas nozzle 97, from which the shield gas flow 8 is allowed to blow to the workpiece 6. Also, the distance between a tip of the shield gas nozzle 97 and a surface of the workpiece 6 (hereinafter referred to as "standoff") is controllable by vertically adjusting the position of the tip of the shield gas nozzle 97 with the shield gas nozzle positioning mechanism 96 provided on the shield gas nozzle 97. In the present embodiment, an electrical actuator is used for the shield gas nozzle positioning mechanism 96. In addition, the shield gas nozzle positioning mechanism 96 is controlled by external signals from the controller 9, and the position of the shield gas nozzle 97 is vertically adjustable during a cladding operation. The method for adjusting the standoff is the same as that in the first embodiment.

Meanwhile as shown in FIG. 5, the powder feeder 30 provided around the periphery of the laser emitting unit 13 includes the inner nozzle 31 and the outer nozzle 32, each of the nozzles being shaped a truncated cone in the tip region on the workpiece side and having a central axis that is identical with the laser optical axis. The inner nozzle 31 is mounted around the periphery of the laser emitting unit 13, and the outer nozzle 32 is mounted around the periphery of the inner nozzle 31. The gap between the inner nozzle 31 and the outer nozzle 32 is the powder flow path 41, through which the powdered filler material delivered from the powder feed source 2 is allowed to flow. The filler material powder 4 is delivered such that it concentrates on a predetermined position.

The position of the inner nozzle 31 is adjustable vertically along the laser optical axis by the powder feeder vertical positioning mechanism 92 disposed atop the inner nozzle 31. Since the inner nozzle 31 and the outer nozzle 32 are coupled with each other, the vertical motion of the inner nozzle 31 is accompanied by the vertical motion of the outer nozzle 32. As a result, the position of the tip of the powder feeder 30 is changed vertically, which makes it possible to adjust the powder concentration position. In the present embodiment, an electrical actuator is used for the powder feeder vertical positioning mechanism 92. In addition, since the powder feeder vertical positioning mechanism 92 is controlled by external signals from the controller 9, the position of the powder feeder 30 is vertically adjustable during a cladding operation.

Furthermore, the position of the outer nozzle 32 is adjustable vertically along the laser optical axis with the outer nozzle vertical positioning mechanism 98 disposed atop the outer nozzle 32. Since changing the vertical position of the outer nozzle 32 changes the relative position between the lower ends of the inner nozzle 31 and the outer nozzle 32, the powder delivery angle is adjustable, and therefore, the powder concentration diameter is controllable. In the present embodiment, an electrical actuator is used for the outer nozzle vertical positioning mechanism 98. In addition, since the outer nozzle vertical positioning mechanism 98 is controlled by external signals from the controller 9, the powder concentration diameter is adjustable during the cladding operation.

Figure 6:
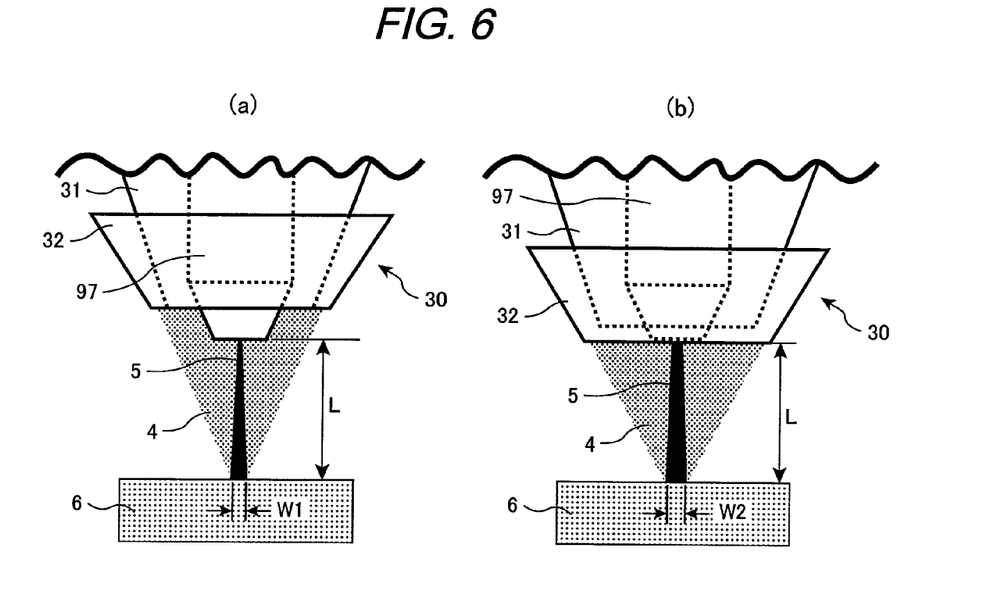
FIG. 6 is schematic diagrams showing a method for controlling a cladding track width of a laser processing head in accordance with the second embodiment.

FIG. 6 is schematic diagrams showing a method for controlling a cladding track width of a laser processing head in accordance with the second embodiment. Specifically, FIG. 6(a) shows a relative position of each part when the cladding track width is assumed to be W1. FIG. 6(b) shows another relative position of each part after the cladding track width is changed to W2. To change the cladding track width from W1 to W2, the laser spot diameter and the powder concentration diameter need to be comparable to the cladding track width W2. The laser focal position is adjusted vertically along the laser optical axis to change the laser spot diameter while at the same time the lower end position of the shield gas nozzle 97 is adjusted with the shield gas nozzle positioning mechanism 96 shown in FIG. 5 such that the standoff is maintained to be the constant distance L. Also, the position of the outer nozzle 32 is adjusted vertically along the laser optical axis with the outer nozzle vertical positioning mechanism 98 shown in FIG. 5 to adjust the relative position between the inner nozzle 31 and the outer nozzle 32, thus changing the powder delivery angle so as to match the powder concentration diameter to W2. In addition, the position of the powder feeder 30 is adjusted vertically along the laser optical axis by the powder feeder vertical positioning mechanism 92 shown in FIG. 5 to set the powder concentration position on the surface of the workpiece 6. However, the optimal powder concentration position is not to be considered limited to the surface of a workpiece.

Controlling the above-described operations at the same time by external signals makes it possible to arbitrarily adjust the cladding track width. Consequently, in the laser cladding processing head in accordance with the present embodiment, there is no need to discontinue a cladding operation every time the need arises to change the cladding track width.

Although in the second embodiment, the powder flow path 41 is determined by the shapes of the inner nozzle 31 and the outer nozzle 32, the shapes of the inner nozzle 31 and the outer nozzle 32 are not to be considered limited to those described in the drawings. Also in the present embodiment, the inner nozzle 31 and the outer nozzle 32 are coupled with each other such that the vertical motion of the inner nozzle 31 is accompanied by the vertical motion of the outer nozzle 32. However, the nozzles may not be coupled with each other. In that case, the relative position of the lower end of each nozzle is adjusted by moving the nozzles vertically independently of each other so as to adjust the powder concentration diameter. In addition, although in the present embodiment, an electrical actuator is used for the powder feeder vertical positioning mechanism 92, the outer nozzle vertical positioning mechanism 98 and the shield gas nozzle positioning mechanism 96, the configuration is not to be considered limited to this.

[Third Embodiment of the Invention]

Figure 7:
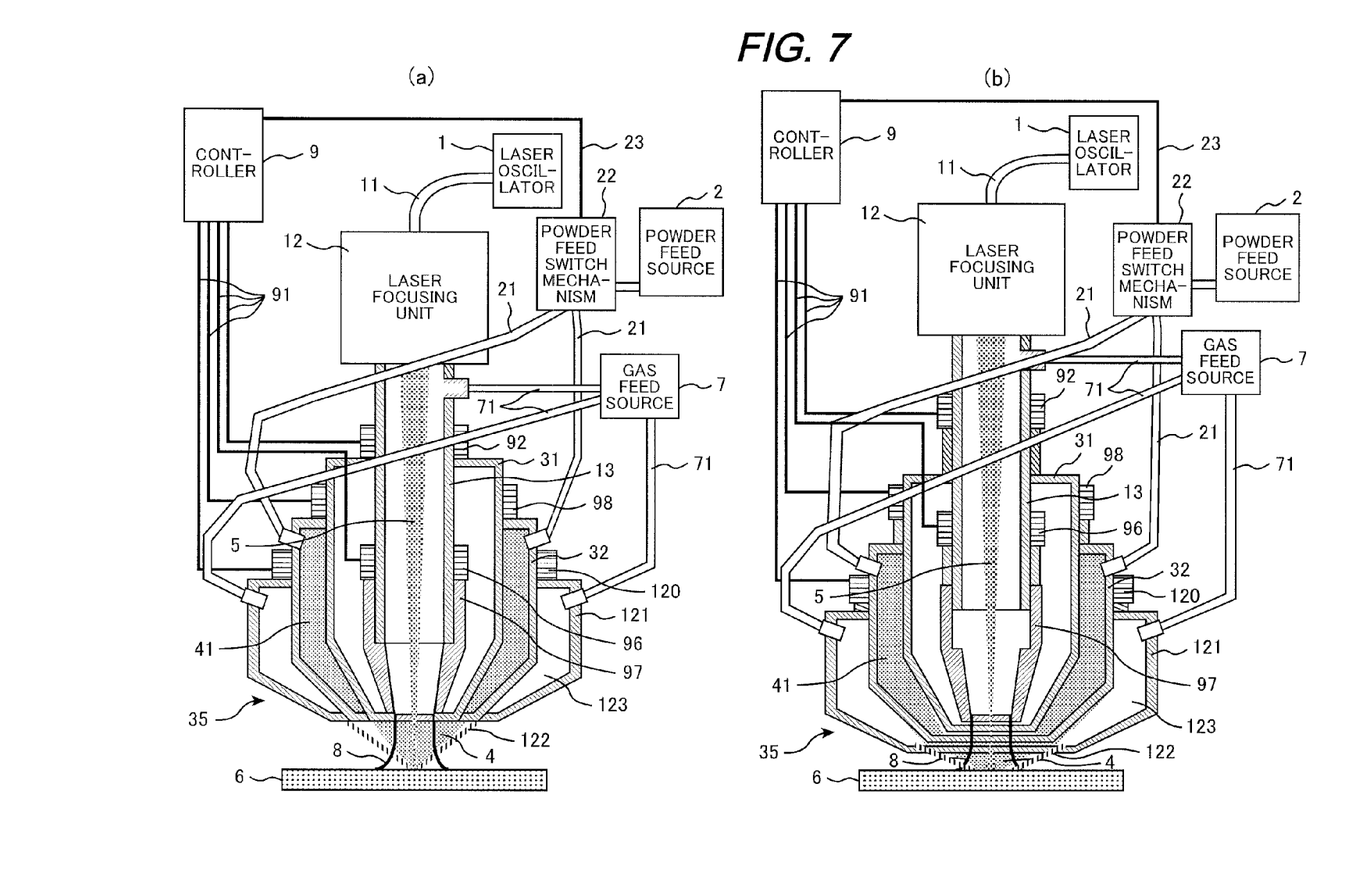
FIG. 7 is schematic diagrams showing a cross-sectional view of a laser processing head in accordance with a third embodiment of the present invention.

FIG. 7 is schematic diagrams showing a cross-sectional view of a laser processing head in accordance with a third embodiment of the present invention. Specifically, FIG. 7(a) shows an exemplary arrangement of the laser processing head; and FIG. 7(b) shows another exemplary arrangement thereof. As shown in FIGS. 7(a) and 7(b), the laser processing head includes: a laser oscillator 1, an optical fiber 11, a laser focusing unit 12, a laser emitting unit 13, a powder feed source 2, powder feed tubes 21, a powder feed switch mechanism 22, a powder feed switch signal line 23, a powder feeder 35, an inner nozzle 31, an outer nozzle 32, a powder flow path 41, a gas feed source 7, gas feed tubes 71, a controller 9, vertical drive control signal lines 91, a powder feeder vertical positioning mechanism 92, a shield gas nozzle positioning mechanism 96, a shield gas nozzle 97, an outer nozzle vertical positioning mechanism 98, a gas nozzle vertical positioning mechanism 120, a gas nozzle 121, and a gas flow path 123. FIG. 7 also shows: filler material powder 4, a laser light 5, a workpiece 6, a shield gas flow 8, and a gas flow 122.

The laser light 5 oscillated by the laser oscillator 1 is transmitted through the optical fiber 11 to the laser focusing unit 12, where it is focused, and it is irradiated to the workpiece 6 via the laser emitting unit 13. The powder feed source 2 is filled with a powdered filler material to be fed during a cladding operation. The filler material powder 4 fed from the powder feed source 2 is delivered through the powder feed tubes 21 to the powder flow path 41 formed by the inner nozzle 31 and the outer nozzle 32 and discharged such that it concentrates on a laser irradiation portion.

The laser emitting unit 13 connected to the laser focusing unit 12 is provided with the gas feed tube 71 and the shield gas nozzle 97, from which the shield gas flow 8 is allowed to blow to the workpiece 6. Also, the distance between a tip of the shield gas nozzle 97 and a surface of the workpiece 6 (hereinafter referred to as "standoff") is controllable by vertically adjusting the position of the tip of the shield gas nozzle 97 with the shield gas nozzle positioning mechanism 96 provided on the shield gas nozzle 97. In the present embodiment, an electrical actuator is used for the shield gas nozzle positioning mechanism 96. In addition, since the shield gas nozzle positioning mechanism 96 is controlled by external signals from the controller 9, the position of the shield gas nozzle 97 is vertically adjustable during a cladding operation. The method for adjusting the standoff is the same as that in the first embodiment.

Meanwhile as shown in FIG. 7, the powder feeder 35 provided around the periphery of the laser emitting unit 13 includes the inner nozzle 31, the outer nozzle 32, and the gas nozzle 121, each of the nozzles being shaped a truncated cone in the tip region on the workpiece side and having a central axis that is identical with the laser optical axis. The inner nozzle 31 is mounted around the periphery of the laser emitting unit 13; the outer nozzle 32 is mounted around the periphery of the inner nozzle 31; and the gas nozzle 121 is mounted around the periphery of the outer nozzle 32. The gap between the inner nozzle 31 and the outer nozzle 32 is the powder flow path 41, through which the powdered filler material delivered from the powder feed source 2 is allowed to flow. The gap between the outer nozzle 32 and the gas nozzle 121 is the gas flow path 123, through which the gas fed from the gas feed source 7 is allowed to flow. The filler material powder 4 is delivered such that it concentrates on a predetermined position.

The position of the inner nozzle 31 is adjustable vertically along the laser optical axis by the powder feeder vertical positioning mechanism 92 disposed atop the inner nozzle 31. Since the inner nozzle 31 and the outer nozzle 32 are coupled with each other, the vertical motion of the inner nozzle 31 is accompanied by the vertical motion of the outer nozzle 32. As a result, the position of the tip of the powder feeder 35 is changed vertically, which makes it possible to adjust the powder concentration position. In the present embodiment, an electrical actuator is used for the powder feeder vertical positioning mechanism 92. In addition, since the powder feeder vertical positioning mechanism 92 is controlled by external signals from the controller 9, the position of the powder feeder 35 is vertically adjustable during a cladding operation.

Moreover, the position of the outer nozzle 32 is adjustable vertically along the laser optical axis with the outer nozzle vertical positioning mechanism 98 disposed atop the outer nozzle 32. Since changing the vertical position of the outer nozzle 32 changes the relative position between the lower ends of the inner nozzle 31 and the outer nozzle 32, the powder delivery angle is adjustable, and therefore, the powder concentration diameter is controllable. In the present embodiment, an electrical actuator is used for the outer nozzle vertical positioning mechanism 98. In addition, since the outer nozzle vertical positioning mechanism 98 is controlled by external signals from the controller 9, the powder concentration diameter is adjustable during the cladding operation.

Furthermore, the position of the gas nozzle 121 is adjustable vertically along the laser optical axis with the gas nozzle vertical positioning mechanism 120 disposed atop the gas nozzle 121. Since changing the vertical position of the gas nozzle 121 changes the relative position between the lower ends of the outer nozzle 32 and the gas nozzle 121, the delivery angle of the gas flow 122 is adjustable. Thereby, the powder concentration diameter is controllable because the powder delivery angle is controllable by the delivery angle of the gas flow 122. More specifically, the gas flow 122 around the filler material powder 4 has the effect of guiding the powder flow, and thus has the advantages of increasing the degree of powder concentration at the powder concentration position and facilitating the control of the powder concentration diameter. In the present embodiment, an electrical actuator is used for the gas nozzle vertical positioning mechanism 120. In addition, since the gas nozzle vertical positioning mechanism 120 is controlled by external signals from the controller 9, the powder concentration diameter is adjustable during the cladding operation.

Figure 8:
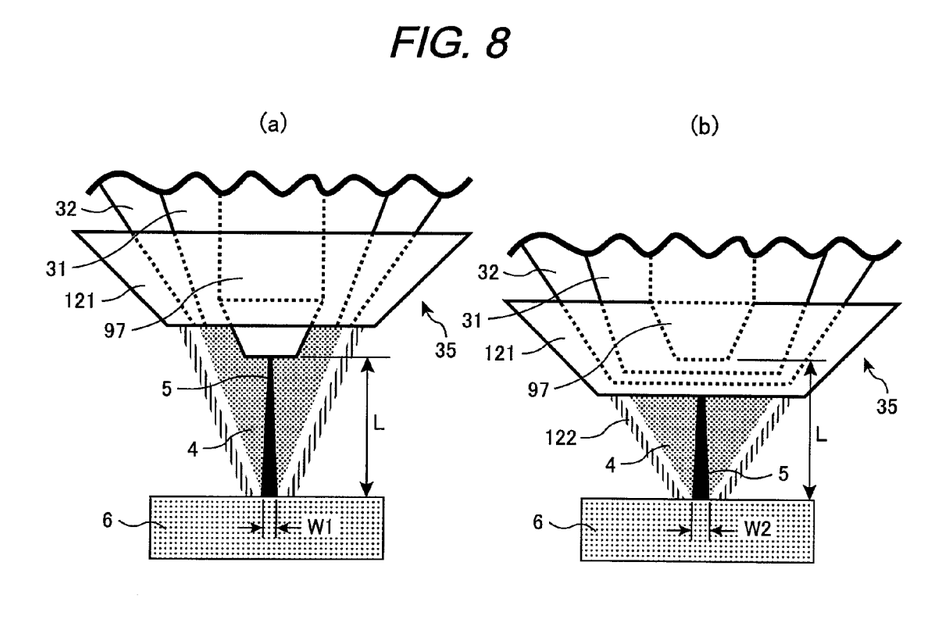
FIG. 8 is schematic diagrams showing a method for controlling a cladding track width of a laser processing head in accordance with the third embodiment.

FIG. 8 is schematic diagrams showing a method for controlling a cladding track width of a laser processing head in accordance with the third embodiment. Specifically, FIG. 8(a) shows a relative position of each part when the cladding track width is assumed to be W1. FIG. 8(b) shows another relative position of each part after the cladding track width is changed to W2. To change the cladding track width from W1 to W2, the laser spot diameter and the powder concentration diameter need to be changed to become comparable to the cladding track width W2. The laser focal position is adjusted vertically along the laser optical axis to change the laser spot diameter to W2 while at the same time the lower end position of the shield gas nozzle 97 is adjusted with the shield gas nozzle positioning mechanism 96 shown in FIG. 7 such that the standoff is maintained to be the constant distance L. Also, the position of the outer nozzle 32 is adjusted vertically along the laser optical axis with the outer nozzle vertical positioning mechanism 98 shown in FIG. 7 to change the relative position between the lower ends of the inner nozzle 31 and the outer nozzle 32, thus changing the powder delivery angle. Moreover, the position of the gas nozzle 121 is adjusted vertically along the laser optical axis with the gas nozzle vertical positioning mechanism 120 shown in FIG. 7 to change the gas delivery angle. This operation changes the powder delivery angle, thus changing the powder concentration diameter. In addition, the position of the inner nozzle 31 is adjusted vertically along the laser optical axis with the powder feeder vertical positioning mechanism 92 shown in FIG. 7 to set the powder concentration position on the surface of the workpiece 6. However, the optimal powder concentration position is not to be considered limited to the surface of a workpiece.

Controlling the above-described operations at the same time by external signals makes it possible to arbitrarily adjust the cladding track width. Consequently, in the laser cladding processing head in accordance with the present embodiment, there is no need to discontinue a cladding operation every time the need arises to change the cladding track width.

Although in the third embodiment, the powder flow path 41 and the gas flow path 123 are determined by the shapes of the inner nozzle 31, the outer nozzle 32, and the gas nozzle 121, the shapes of the nozzles are not to be considered limited to those described in the drawings. Also in the present embodiment, the outer nozzle 32 is mounted on the inner nozzle 31, and the gas nozzle 121 is mounted on the outer nozzle 32 such that the vertical position adjustments of the outer nozzle 32 and the gas nozzle 121 are made in synchronization with each other. However, the nozzles may not be coupled with each other. In that case, powder feed adjustments are made by adjusting each position independently. In addition, although in the present embodiment, an electrical actuator is used for the powder feeder vertical positioning mechanism 92, the outer nozzle vertical positioning mechanism 98, the shield gas nozzle positioning mechanism 96 and the gas nozzle vertical positioning mechanism 120, the configuration is not to be considered limited to this.

Also in the present embodiment, the powder concentration diameter is controlled by controlling the powder delivery angle. The powder delivery angle is controlled by controlling the relative position between the lower ends of the inner nozzle 31 and the outer nozzle 32 and the relative position between the outer nozzle 32 and the gas nozzle 121. However, the powder concentration diameter is also controllable only by controlling the relative position between the lower ends of the outer nozzle 32 and the gas nozzle 121. In addition, the powder concentration diameter is also adjustable by adjusting the gas flow rate to control the powder delivery angle.

The present invention is suitable for use in repairing gas turbine rotor blades and molds, and in surface treatment for auto parts such as valve sheets and plant components, for example.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:
1. A laser processing head comprising:
a laser emitting unit for irradiating a workpiece with a laser light; and
a powder feeder disposed around a periphery of the laser emitting unit for discharging filler material powder to the workpiece, wherein the powder feeder includes:
a position adjustment mechanism for adjusting a position where the powder concentrates; and
a powder concentration diameter adjustment mechanism for adjusting a diameter of the filler material powder on the workpiece,
the laser processing head further comprising a controller for controlling the position adjustment mechanism and the powder concentration diameter adjustment mechanism,
wherein: the powder feeder comprises a plurality of tubular elements disposed such that the filler material powder is discharged from the tubular elements in a form of a concentric circle with a laser optical axis as a center;

the powder concentration diameter adjustment mechanism is a mechanism for adjusting angles of the tubular elements with respect to the laser optical axis, and the plurality of tubular elements have at least two kinds of shapes.

2. The laser processing head according to claim 1, further comprising a shield gas flow adjustment mechanism for adjusting a distance between a position of a tip of a cylindrical element with a central axis that is identical with a laser optical axis and the workpiece, the cylindrical element being provided inside the powder feeder, allowing a gas to flow inside the cylindrical element.

3. The laser processing head according to claim 1, wherein the position adjustment mechanism is a mechanism for changing a position of the powder feeder vertically along a laser optical axis.

4. A laser processing head comprising:
a laser emitting unit for irradiating a workpiece with a laser light; and
a powder feeder disposed around a periphery of the laser emitting unit for discharging filler material powder to the workpiece, wherein the powder feeder includes:
a position adjustment mechanism for adjusting a position where the powder concentrates; and
a powder concentration diameter adjustment mechanism for adjusting a diameter of the filler material powder on the workpiece,
the laser processing head further comprising a controller for controlling the position adjustment mechanism and the powder concentration diameter adjustment mechanism,
wherein: the powder feeder comprises an inner nozzle provided around a periphery of a laser optical axis and an outer nozzle provided around a periphery of the inner nozzle, a tip region of each of the nozzles being shaped a truncated cone, allowing the filler material powder to flow through a gap between the inner nozzle and the outer nozzle; and
the powder concentration diameter adjustment mechanism adjusts a relative position between the tip of the inner nozzle and the tip of the outer nozzle vertically along the laser optical axis.

5. The laser processing head according to claim 4, further comprising a gas flow adjustment mechanism for adjusting a relative position between a tip of a gas nozzle and the tip of the outer nozzle, the tip region of the gas nozzle being shaped a truncated cone, the gas nozzle being provided around a periphery of the powder feeder, allowing a gas to flow through a gap between the outer nozzle and the gas nozzle.

6. A laser cladding method for forming a clad by irradiating a workpiece with a laser light and delivering filler material powder to a laser irradiation portion on the workpiece, the laser cladding method being conducted with a laser processing head, the laser processing head comprising:
a laser emitting unit for irradiating a workpiece with a laser light; and
a powder feeder disposed around a periphery of the laser emitting unit for discharging filler material powder to the workpiece, wherein the powder feeder includes:
a position adjustment mechanism for adjusting a position where the powder concentrates; and
a powder concentration diameter adjustment mechanism for adjusting a diameter of the filler material powder on the workpiece,
the laser processing head further comprising a controller for controlling the position adjustment mechanism and the powder concentration diameter adjustment mechanism,
the laser cladding method comprising steps of:
setting a focal position of the laser light and a position where a flow of the filler material powder concentrates most on a laser optical axis; and
controlling the focal position of the laser light and the position where the flow of the filler material powder concentrates most independently during a cladding operation.

7. The laser cladding method according to claim 6, further comprising step of controlling the position where the flow of filler material powder concentrates most during the cladding operation.

8. The laser cladding method according to claim 6, further comprising steps of:
delivering the filler material powder through a powder flow path formed by a plurality of tubular elements; and
controlling the position where the flow of the filler material powder concentrates most by moving a powder feeder along the laser optical axis.

9. The laser cladding method according to claim 6, further comprising steps of:
delivering the filler material powder through a powder flow path formed by a plurality of tubular elements disposed radially with respect to the laser optical axis; and
controlling a powder delivery angle by changing angles of the tubular elements with respect to the laser optical axis.

10. The laser cladding method according to claim 6, further comprising step of blowing a gas from a cylindrical element provided inside a powder feeder to a surface of the workpiece such that the gas flows inside the flow of the filler material powder while maintaining a constant distance between a lower end position of the cylindrical element and the surface of the workpiece.

11. The laser cladding method according to claim 6, further comprising step of adjusting the flow of the filler material powder by a gas flow provided outside the flow of the filler material powder.

12. The laser cladding method according to claim 11, further comprising step of adjusting the flow of the filler material powder through a gap between an inner nozzle and an outer nozzle by changing a position of a tip of the outer nozzle and a position of a tip of a gas nozzle provided around a periphery of the outer nozzle so as to change an angle of the gas flow.

* * * * *